(12) United States Patent
Meaney et al.

(10) Patent No.: US 10,037,218 B1
(45) Date of Patent: Jul. 31, 2018

(54) SCALABLE DEEP TESTING SYSTEM FOR WEBSITES

(71) Applicant: Amazon Technologies, Inc., Seattle, WA (US)

(72) Inventors: Michael Patrick Meaney, Dublin (IE); Tamas Polyak, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 683 days.

(21) Appl. No.: 14/571,041

(22) Filed: Dec. 15, 2014

(51) Int. Cl.
| | | |
|---|---|---|
| G06F 21/57 | (2013.01) | |
| G06F 9/455 | (2018.01) | |
| G06F 17/30 | (2006.01) | |
| H04L 29/06 | (2006.01) | |

(52) U.S. Cl.
CPC ........ *G06F 9/455* (2013.01); *G06F 17/30876* (2013.01); *G06F 21/577* (2013.01); *H04L 63/1433* (2013.01); *G06F 2221/034* (2013.01)

(58) Field of Classification Search
CPC ............. G06F 21/577; G06F 2221/034; G06F 2221/033; G06F 17/30876; H04L 63/1433; H04L 63/144
See application file for complete search history.

(56) References Cited

U.S. PATENT DOCUMENTS

| | | | | |
|---|---|---|---|---|
| 7,231,606 | B2 * | 6/2007 | Miller | H04L 43/50 702/186 |
| 7,483,841 | B1 * | 1/2009 | Jin | G06Q 10/06 705/7.11 |
| 7,934,253 | B2 * | 4/2011 | Overcash | G06F 21/55 726/11 |
| 8,161,453 | B2 * | 4/2012 | Chrabieh | G06F 9/4881 717/106 |
| 8,370,474 | B1 * | 2/2013 | Reeves | G06F 11/0793 707/691 |
| 2012/0011511 | A1 * | 1/2012 | Horvitz | G06F 9/461 718/100 |
| 2014/0245460 | A1 * | 8/2014 | Sum | G06F 21/577 726/28 |
| 2015/0082442 | A1 * | 3/2015 | Chauhan | H04L 63/1433 726/25 |

* cited by examiner

*Primary Examiner* — Chirag R Patel
(74) *Attorney, Agent, or Firm* — Baker & Hostetler LLP

(57) ABSTRACT

A web-based service may be enabled for simulating test conditions for sub-operations performed by back-end components. The service may operate in production while being tested. A cookie indicating a sub-operation and an intended test condition for the sub-operation may be included in a request to perform an operation. The cookie may be forwarded from a front-end computing node to a computing node that issues a request to perform the indicated sub-operation. The request to perform the sub-operation may be intercepted. The indicated test condition for the sub-operation may be simulated.

18 Claims, 5 Drawing Sheets

SCALABLE DEEP TESTING SYSTEM FOR WEBSITES

BACKGROUND

Web-based services such as websites and web-based application programming interfaces may operate on a front-end component, such as a web server, that is connected to various back-end components such as databases, other web services, application servers, and so on. In some cases, these components may in turn call additional components. As a result, a failure in a web-based service may occur in a variety of locations, including within a component that is separated by a number of degrees from the front-end component.

A traditional approach to website testing is done using a browser, and by clicking on various links or buttons to see if the response returned by the website is the one that is expected. This may be done manually or using tools that automated the testing. However, failures involving nested components are often difficult to debug, and furthermore are often difficult to test. One approach to testing this type of failure involves simulating the failure of a back-end component. Typically, debugging code is included in a test version of the system and used to simulate the failure. The debugging code often requires configuration and may be excluded from production versions of the system, which limits the usefulness of this approach. In addition, this approach is even more difficult to apply to testing a variety of different behaviors, particularly those involving back-end components such as databases.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
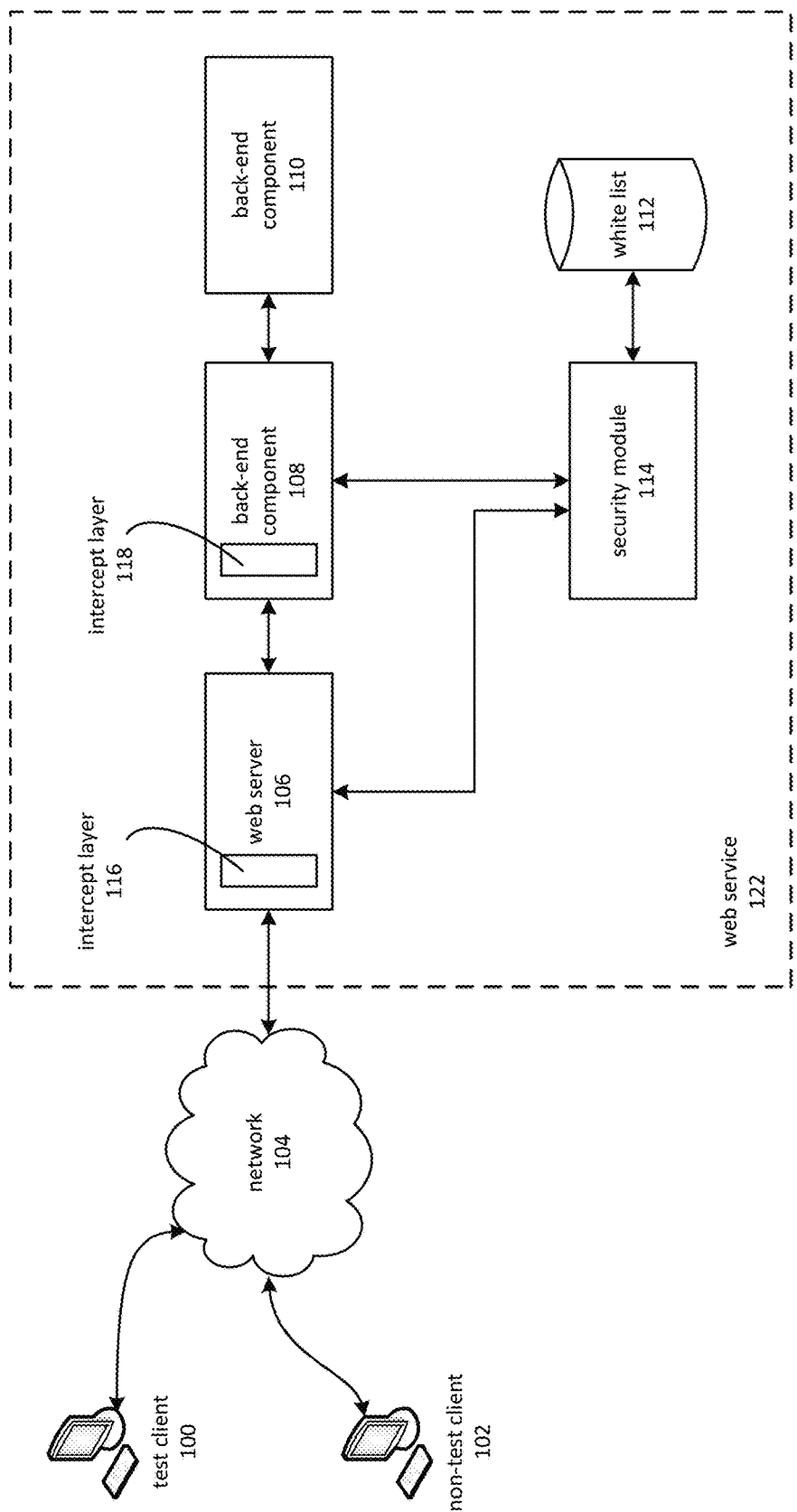
FIG. 1 is a block diagram depicting an example of a system enabled for multi-level testing in a production web-service.

Described herein are systems and methods for testing components of a web-based service operating in production, including nested components that may be behind a front-end component of the web-based service, such as a webserver. A system that is operating in production includes one that is accessible to and being used by non-test clients. While the system is operating in production, clients developed for testing purposes may also access the system in order to evaluate programmatic responses that result from various test conditions occurring in various components.

A client, as used herein, may refer to various applications that access a web-based service and request that some operation be performed by the service on its behalf. For example, this could include a computing device running a web browser to access a remote service. A client can also include an application comprising web-browsing functions such as support for hypertext transfer protocol ("HTTP"). The operations requested by the client may consist of sub-operations that are performed on various back-end components, such as a database or other remote computing service. A sub-operation may itself be an intermediary operation that, in turn, invokes additional sub-operations on other back-end components.

In an embodiment, a system may include a front-end computing node that hosts a web-based service. When requested to perform an operation on behalf of a client, for example from a web browser running on a client computing device, the front-end computing node may transmit a request to perform an intermediary sub-operation to a second computing node. The second computing node may, in turn, transmit a request to perform an additional sub-operation to a third computing node. The second and third computing nodes may correspond to various back-end components and services, such as databases. In one example, a first computing node might operate a web server, which can receive an HTTP request from the client and begin to process it. During the course of processing the request, the web server might invoke a web service application programming interface ("API") hosted on the second computing node. While processing the invocation of the interface, the second computing node might then issue a request to retrieve data from a database hosted on the third computing node.

The system may receive a request to perform an operation at the first computing node, such as a webserver. The client transmitting the request to the system may be a test client that is authorized to perform certain tests on the system, for example to check how the system responds to certain test or error conditions. For example, the request can include instructions describing an operation that is to fail, and might further indicate a mode of failure. In addition, the client may be authorized to request that the operation conform to certain test conditions, which may or may not be associated with a failure mode. A test condition can refer to various modes of failure, as well as other conditions or states which may not necessarily involve failure of an operation. Examples of tests or error conditions include, but are not limited to, executing a specific branch of code, returning a specific condition code, a high workload state, a low memory condition, throwing an exception, returning a timeout (or not responding at all), setting a valid return value from a service, returning an error value from a service, and other operating conditions.

The data or instructions to perform the test on the remote system (e.g., the web-based service) may be included in a cookie appended to and transmitted with the request. The data or instructions may include information including both the expected mode of failure or test condition, as well as information identifying sub-operations to which the failure mode or test condition should apply. Note that, without the presence of the cookie, the request functions as an ordinary request and no test condition will be simulated. Accordingly, the cookie may be considered to have been appended to the request because it does not directly modify the request. The technique of appending the cookie to perform the remote testing has various advantages. Among the advantages are that conventional requests—such as those captured during operation of the real-time system—may be reused, but the cookie may be changed to include appropriate test instruction, in order to simulate various test conditions. This may allow improved efficiency in identifying and debugging intermittent errors when a certain cause is suspected but not known, since the suspected cause can be simulated in the actual context in which it occurred. Another advantage is that the design and implementation of tests may be simplified, since the code that originates the request need not be modified in every case—instead, a different appended cookie may be substituted for each test case. In addition, another advantage of testing in the ways described herein is that it allows for deeply-nested components to be more easily tested. The cookie may be transferred between layers—for example between a web server and a web service API invoked by the web server—in order to allow the web service to simulate errors or test conditions.

The first computing node, such as a webserver, may initiate processing of a client's request, including various operations, sub-operations, and intermediary operations, after determining that a user account associated with the client is authorized to issue the request. In addition, there may be a determination that a user account associated with the client is authorized to perform testing, including the aforementioned test conditions and modes of failure. Both test clients and non-test clients may be authorized to issue a request, but only authorized test clients should be able to perform testing.

For example, to perform various tests of the web-based system, a test procedure, such as a program, data, or instructions, may control or simulate how a web browser operates, for example by simulating which page is loaded or what buttons or links are clicked. The program, data, or instructions may be included in a cookie, which may include particular information or values associated with running a test to perform test or error conditions. The contents of the cookie instruct the first computing node (e.g., the remote webserver) what to do when it is responding to the request, including how to call particular web service APIs and how to interact with one or more back-end services. For example, the cookie may provide an instruction to timeout when calling the back-end service. For instance, the cookie may include instructions or data like the following: {"service": "server.network.com\api", "method": "getData", "type": "exception", "exception": "NullPointerException"}.

In this example, the cookie provides instructions to perform an exception within the "getData" method of the "server.network.com\api" service. The specific type of exception is also provided. Other errors and test conditions can be specified in a similar manner. For example, a variant of the above cookie might specify that a successful processing of the getData function should be simulated, and might also include the data that the getData function should return as the result of the simulation.

When the client, such as a web browser, sends the request from the client device, all cookies are sent, including the test cookie. When the request is received by the first computing node (e.g., the remote webserver), it may intercept the request and test cookie before any back-end services are initiated. The first computing-node (e.g., the remote webserver) may then analyze the cookie, and data or instructions therein, to see if it includes tests to be performed, for example certain error behaviors. If tests are to be performed, for examples tests associated with how a particular service may react to an error, the particular request is not permitted to go to the service. The first computing node (e.g., the remote webserver) may then implement and simulate the behavior (e.g., the test or error condition), such as executing a specific branch of code, returning a specific condition code, a high workload state, a low memory condition, throwing an exception, returning a timeout (or not responding at all), setting a valid return value from a service, returning an error value from a serve, and other operating conditions.

In addition, the system described herein could perform even deeper testing, such as by having the first computing node pass test instructions to components past the first computing node, like back-end services. For example, during processing of the client's request, including any associated operations and sub-operations, the system may transmit the request to perform the various operations and sub-operations to the second computing node. The decision to transmit the request and test past the first computing node may be determined by instructions in the cookie. The system can include the cookie, or instructions from the cookie, in the request. The second computing node may then intercept the request and test instructions (e.g., from the test cookie), and handle such instructions in a manner similar to what was described above regarding the first computing node.

In addition, during processing of the operations and sub-operations, testing of additional computing nodes, such as a third computing node, may be accomplished. For example, a request to perform the additional sub-operation on the third computing node may be intercepted by the third computing node. The system may determine to intercept the sub-operation based on it being specified in the cookie. The system may then simulate a result of performing the sub-operations, so that the sub-operations appears to have failed in a manner consistent with the specified test conditions in the cookie, as described above.

FIG. 1 is a block diagram depicting an example of a system enabled for multi-level testing in a production web service. A production web service 122 may be described as one that is available to non-test clients, e.g. those who use the service for the intended purpose of the service, rather than as a means of validating the service. In FIG. 1, an example of such as client is non-test client 102, which could, for example, be a browser. The system depicted by FIG. 1 may, however, also support test client 100, which might be a browser or a test application that simulated HTTP requests. A test client 100 may be designed so as to issue a variety of requests to perform operations on the web service 122, and to compare the actual results of the requests with the results that were expected. Some of these tests may involve expected results under various test conditions, such as when a requested operation fails due to lack of memory, a disk failure, a record that could not be found, a programming error, low-memory condition, high network latency, throwing an exception, returning a timeout (or not responding at all), setting a valid return value from a service, returning an error value from a service, and so on. Some of the requests may further be intended to test the result of a certain test condition at a particular point in execution of the operation. In other words, test client 100 may issue requests that it expects to fail with a designated mode of failure while performing a certain sub-operation of the requested operation. For example, the test client 100 may transmit a request to web server 106 that includes instructions for simulating a test condition in back-end component 108, and/or a test condition in back-end component 110. The system depicted in FIG. 1 allows test client 100 to perform this type of test on a production system, while non-test client 102 is able to continue to operate on the same system.

Test client 100 may transmit a request to perform an operation over network 104 to a web server 106. Test client 100 could, for example, be a browser that transmits an HTTP request to web server 106. The network 104 may be any of various types of networks such as the Internet or a local area network. The request may be an HTTP request, and may comprise a cookie containing data that includes instructions to perform a test, for example, to test certain responses and conditions when a service fails.

An operation may comprise some number of sub-operations that may be performed by a component other than a front-end web server 106. It may be the case that, for example, web server 106 invokes sub-operations on a first back-end component 108. Moreover, back-end component 108 may in turn invoke a further sub-operation on a second back-end component 110. The sub-operation and mode of failure requested by test client 100 might then, under "normal" failure conditions (e.g. those occurring under other than test conditions) might occur on back-end component 110.

The system depicted in FIG. 1 may, however, simulate the designed test condition using intercept layers 116 and 118. As noted, a request from test client 100 may contain a cookie that includes instructions for operations or sub-operation intended to fail and the intended mode of failure, among other testing scenarios. At each stage of performing an operation that traverses a sub-operation boundary (such as that between web server 106 and back-end component 108, or back-end component 108 and back-end component 110), the cookie, or information therefrom in whole or in part, may be forwarded across the boundary.

An intercept layer 116 operating on web server 106 may intercept requests to perform operations and sub-operations on back-end component 108. The interception may occur prior to actually invoking the operations and sub-operation. For example, the interception may occur within a function that transmits a request to perform the sub-operation to back-end component 108. If the cookie indicates that the requested operation should fail, intercept layer 116 may simulate the intended mode of failure rather than transmit the request. Interception of a sub-operation may, in some cases, comprise configuring an interception point to redirect code that would invoke the sub-operation to instead invoke a simulation.

A similar process may occur at back-end component 108. The back-end component 108 may receive the cookie in a request to perform a sub-operation received from web server 106. Requests to invoke a further sub-operation on back-end component 110 may be intercepted by intercept layer 118. If the cookie indicates that the further sub-operation should fail, intercept layer 118 may simulate the intended mode of failure rather than forward the request to perform the further sub-operation to back-end component 110.

In order to prevent a non-test client 102 from causing or exploiting the test capabilities provided by the system, a security module 114 validates the extent to which an incoming request is authorized to cause failures. Test client 100 may be associated with a user account known to security module 114 and/or white list 112. The white list 112 may be a database maintaining user account credential information. The various components, such as web server 108 or back-end component 108, may determine to enable intercept layers 116 and 118 based on determining that a request is associated with a user account present in the white list 112.

Figure 2:
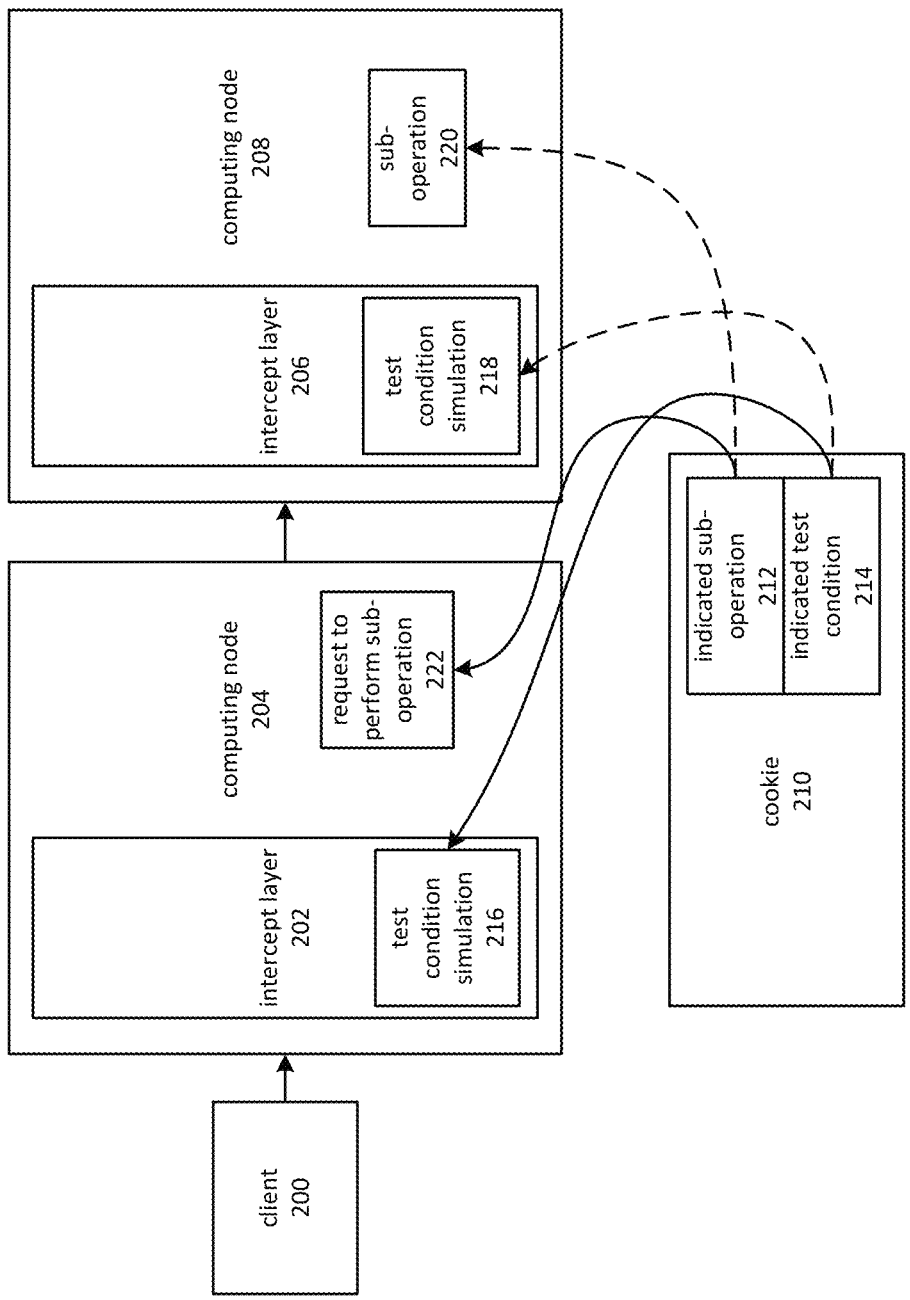
FIG. 2 is a block diagram depicting an example of simulating a test condition for a sub-operation using interception layers.

FIG. 2 is a block diagram depicting an example of simulating a test condition for a sub-operation using intercept layers. A client 200 may issue a request to perform an operation to computing node 204. In an embodiment, while the operation is being performed an intercept layer 202 may detect a request to perform sub-operation 222. Due to the presence of a corresponding indicated sub-operation 212 in cookie 210, intercept layer 202 may perform test condition simulation 216. The test condition simulation 216 may, based on indicated test condition 214 in cookie 210, fail in a manner consistent with indicated failure mode 214. For example, cookie 210 might include the information {"service": "internal.server.com\api", "method": "getData", "type": "exception", "exception": "NullPointerException"}. Assuming that computing node 204 invokes the "getData" method of the "internal.server.com\api," which would normally be performed on computing node 208, the NullPointerException can be simulated in test condition simulation 216 on computing node 204.

In some cases and embodiments, the request to perform the sub-operation might be forwarded to computing node 208, where sub-operation 220 would normally be performed. Rather than intercept layer 202 intercepting request to perform sub-operation 222 and performing test condition simulation 216 at computing node 204, embodiments may intercept sub-operation 220 at computing node 208. Intercept layer 206 may intercept sub-operation 220 and perform test condition simulation 218, with a result that corresponds to the indicated test condition 214.

Figure 3:
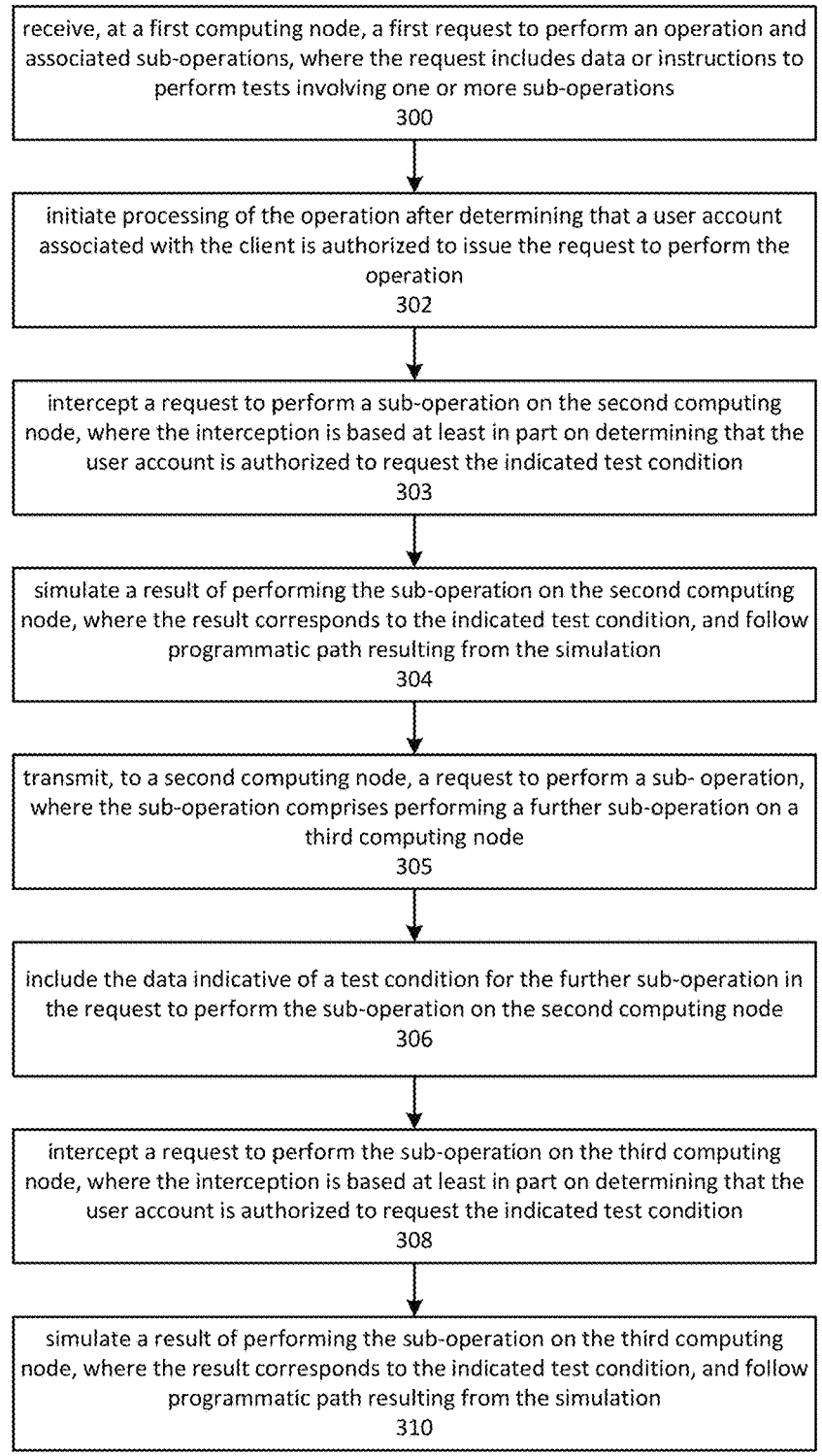
FIG. 3 is a flow diagram depicting an example of a process for simulating test conditions in a live web service using intercept layers.
Figure 4:
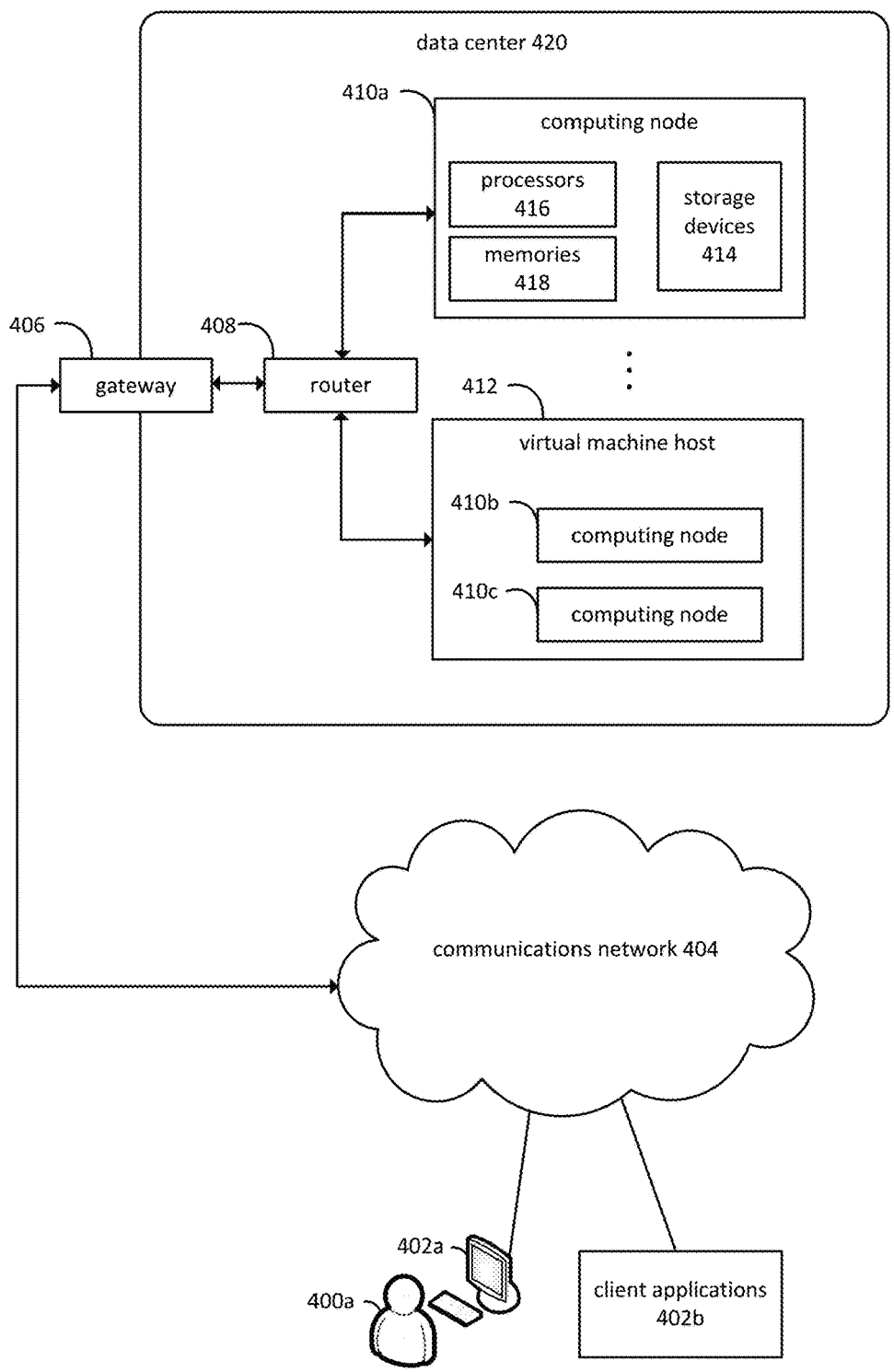
FIG. 4 is a block diagram depicting an embodiment of a computing environment in which aspects of the present disclosure may be practiced.

FIG. 3 is a flow diagram depicting an example of a process for simulating test conditions in a live web service using intercept layers. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 300 depicts receiving, at a first computing node, a first request to perform an operation and sub-operations, where the request includes data or instructions to perform a test, for example contained within a cookie. Performing the operation may include processing one or more sub-operations that are intended to fail with an indicated mode of failure in a test scenario. The sub-operations may be performed on various subcomponents of the system that is performing the operation. For example, performing the operation may be initiated on a first computing node, which may then invoke a sub-operation on a second computing node. That operation may then, in turn, invoke an additional sub-operation on a third computing node.

As depicted by block 302, embodiments may initiate processing of the operation after determining that a user account associated with the client is authorized to issue the request to perform the operation. This may be the case for clients not involved in testing, as well as those clients that are involved in testing. A user account may be associated with a client by the client process running in the context of the user account, or by the client supplying credentials corresponding to the user account.

At block 303, embodiments may intercept a request to perform a sub-operation on the second computing node. The interception may be based at least in part on determining that the user account is authorized to request the test condition, as indicated by the test cookie appended to the request.

The interception of the request to perform the sub-operation on the second computing node may be based at least in part on two factors. First, the interception may be based on identifying the sub-operation as one whose failure was indicated in a cookie or other data included in the request. Second, the interception may be based on determining that the user account is authorized to request the indicated test condition. A client designed for test purposes may be associated with a test account that is whitelisted to request that certain operations fail, in accordance with the testing goals. Other clients—including clients not intended to be used for testing—would not typically be associated with such accounts. For security purposes, embodiments may restrict the use of some or all specified test conditions to those clients associated with an appropriate user account.

Interception of a request to perform a sub-operation may be performed through various mechanisms. These may include the application of code introspection techniques that may be used to inject interception code, as well as pre-wired interception hooks. In various embodiments, interception code may be enabled or disabled on a per-request basis, so that the interception code is either not executed or is minimally executed when a client is not authorized to invoke a particular mode of failure. One approach to doing this involves determining to remove the cookie or other data indicative of a requested mode of failure when it is determined that the user is not authorized to request a failure. For example, a front-end computing node might determine, for a user account associated with a client issuing a request, that the client is not authorized to request that a failure even though a cookie indicating a test condition was included in the request. The cookie could be removed from the stream of requests (for example, from front-end to a second computing node, from the second computing node to a third computing node, and so on). If the user account was authorized to request a failure, the cookie might remain in the stream. The presence or absence of the cookie, subsequent to the point at which the cookie is either removed or left in place, may be used to determine whether or not a request should be intercepted.

At block 304, the embodiment may simulate the result of performing the sub-operation on the second computing node. This may be done, for example, by simulating on the first computing node a failure code or exception at the invocation point of the sub-operation, rather than actually invoking the sub-operation on the second computing node. In another example, the request might have included a test cookie that refers to a web-based programming interface that can be performed on the second computing node, and provided a dataset that should be the simulated result of invoking the interface.

The normal programmatic path that would result from performing the sub-operation, and obtaining the simulated result while doing so, would then be followed. In other words, if the simulated test condition was an exception, the flow of control might transfer to an exception handling mechanism. This might, in some cases, result in the abrupt termination of the operation. In other cases, depending upon the particular operation or sub-operation, and the simulated test condition, the programmatic path might continue executing. Further test instructions for additional operations may be included in the test cookie.

At block 305, an embodiment transmits a request to perform a sub-operation to a second computing node. In the example of FIG. 3, it is assumed for illustrative purposes that the programmatic path resulting from the simulated test condition at block 304 would lead to the sub-operation on the second computing node. It will be appreciated, however, that this might not be the case in all instances.

As depicted by block 306, the request includes the data indicative of the operation or sub-operation that is intended to fail and the mode of failure in the test scenario. As with the test information utilized at blocks 303 and 304, the test information may be specified through a cookie included in an HTTP request transmitted from client to the first computing node. The test cookie, or test information derived from it, may then be passed from the first computing node to the second computing node. Note that, in some cases, the test cookie may indicate errors or test conditions to be simulated at multiple locations, e.g. in various operations or sub-operations. In could also be the case that only one error or test condition is to be simulated, and that the location at which the error or test condition is to be simulated is deeply nested under many levels of operations and sub-operations.

In the case depicted by FIG. 3, performing the sub-operations comprises performing further sub-operations on a third computing node. At block 308, an embodiment intercepts a request to perform the sub-operation on the third computing node. The interception may be based on identifying the sub-operation as one whose failure or test condition was indicated in a cookie or other data included in the request and forwarded from the sub-operation performed on the second computing node.

At block 310, an embodiment simulates a result of performing the sub-operation, where the result corresponds to the indicated test condition. Simulating a particular test condition can include causing a variety of effects. Examples include, but are not limited to, throwing exceptions, returning error codes, causing a side effect such as low-memory condition, hanging, timing-out, delaying response time, and so on. The results of the simulation may be returned to the user, generally by the processing of the request following the programmatic path that results from simulating the test condition. In some cases, this may mean that no result is returned—for example in the case of a hang condition.

FIG. 3 depicts a sub-operation performed on the second computing node and another sub-operation performed on a third computing node. However, this configuration is intended to be illustrative and should not be viewed as limiting the scope of the present disclosure. In some instances, operations and sub-operations may be performed on a single computing node, or on multiple computing nodes in various permutations.

Aspects of the present disclosure may be better understood through the following examples. The examples may be combined in any permutation to form additional embodiments.

In a first example, a system or computer program product may comprise memories or non-transitory computer-readable storage media that has stored thereon instructions that, upon execution by one or more computing devices, cause the one or more computing devices at least to receive a first request to perform an operation on behalf of a client, where the operation comprises a sub-operation, which can comprise further sub-operations. The request to perform the operation includes data that specifies the sub-operation and a mode of failure for the sub-operation.

The instruction, upon execution, may further cause the one or more computing devices to transmit, during processing of the operation, a second request to perform the sub-operation on a second computing node. The second request comprises the data indicative of the mode of failure for the sub-operation. The instructions, upon execution, may further cause the one or more computing devices to intercept, during processing of the sub-operation, a third request to perform a further sub-operation. The interception is based at least in part on the data indicative of the sub-operation. After interception, the one or more computing nodes then simulate the test condition. For example, the one or more computing nodes may simulate a failure of the third request to perform the sub-operation, where the simulated failure is based at least in part on a test condition specifying a particular mode of failure.

In a second example, which may be combined with the other examples in any permutation, a cookie comprises the data indicative of the mode of failure.

In a third example, which may be combined with examples one and two in any permutation, the instructions, upon execution, cause the one or more computing devices to at least transmit at least a subset of the cookie with the second request to perform the sub-operation.

In a fourth example, which may be combined with examples one through three in any permutation, the data indicative of the mode of failure comprises a plurality of data segments, each data segment comprising information corresponding to one or more of a plurality of sub-operations, including the sub-operation, performed during processing of the operation.

In a fifth example, which may be combined with examples one through four in any permutation, the instructions, upon execution, cause the one or more computing devices to at least determine that a user account associated with the client is authorized to specify the mode of failure by at least retrieving a record indicative of the user account being associated with a test function.

In a sixth example, which may be combined with examples one through five in any permutation, intercepting the third request to perform the sub-operation comprises identifying and redirecting an entry point for a function that invokes the sub-operation.

In a seventh example, which may be combined with examples one through six in any permutation, the data indicative of the mode of failure comprises a service identifier and a response code.

Figure 5:
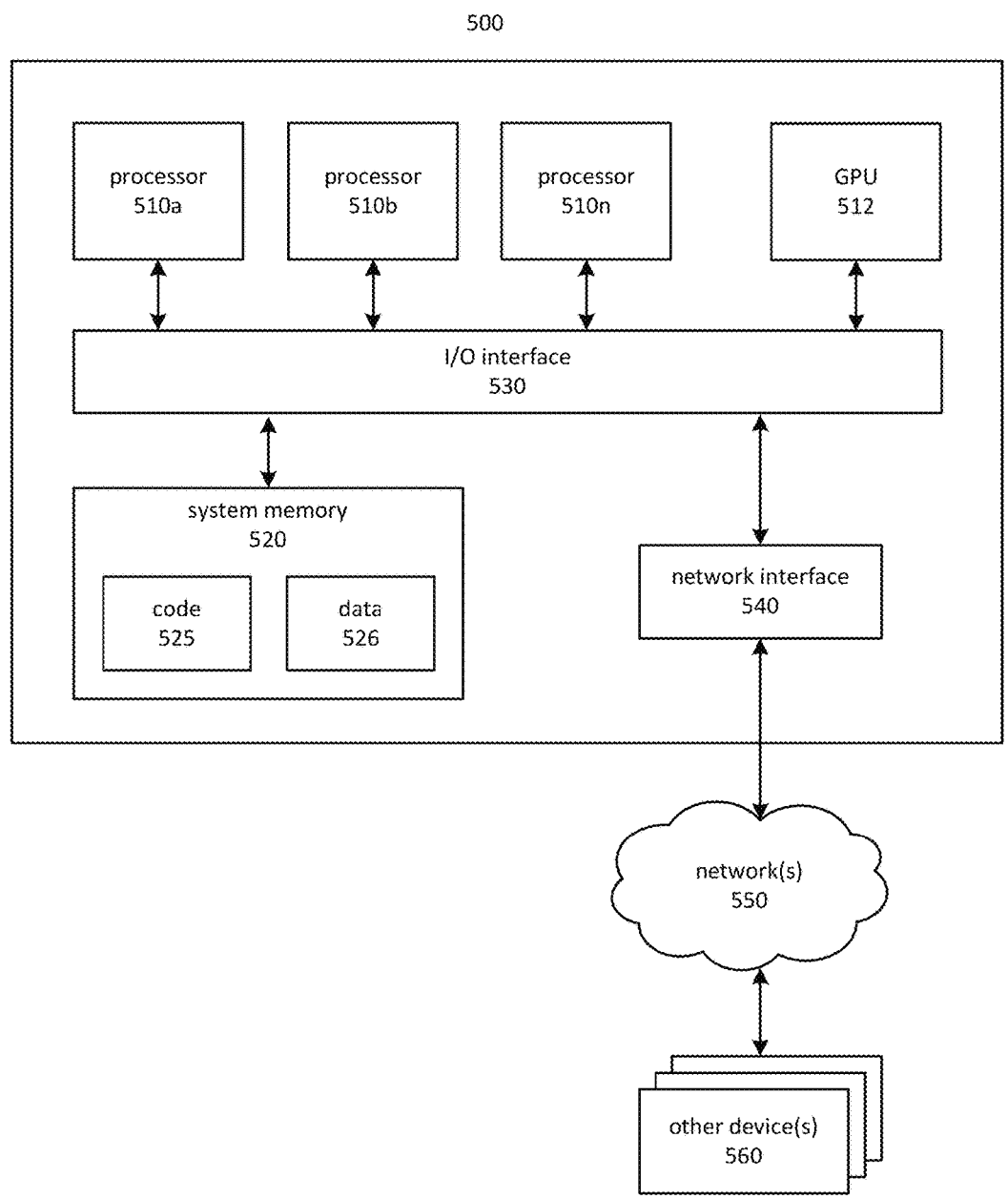
FIG. 5 is a block diagram depicting an embodiment of a computing system on which aspects of the present disclosure may be practiced.

FIG. 5 is a diagram depicting an example of a distributed computing environment on which aspects of the present invention may be practiced. Various users 500a may interact with various client applications, operating on any type of computing device 502a, to communicate over communications network 504 with processes executing on various computing nodes 510a, 510b, and 510c within a data center 520. Alternatively, client applications 502b may communicate without user intervention. Communications network 504 may comprise any combination of communications technology, including the Internet, wired and wireless local area networks, fiber optic networks, satellite communications, and so forth. Any number of networking protocols may be employed.

Communication with processes executing on the computing nodes 510a, 510b, and 510c, operating within data center 520, may be provided via gateway 506 and router 508. Numerous other network configurations may also be employed. Although not explicitly depicted in FIG. 5, various authentication mechanisms, web service layers, business objects, or other intermediate layers may be provided to mediate communication with the processes executing on computing nodes 510a, 510b, and 510c. Some of these intermediate layers may themselves comprise processes executing on one or more of the computing nodes. Computing nodes 510a, 510b, and 510c, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510a is depicted as residing on physical hardware comprising one or more processors 516, one or more memories 518, and one or more storage devices 514. Processes on computing node 510a may execute in conjunction with an operating system or alternatively may execute as a bare-metal process that directly interacts with physical resources, such as processors 516, memories 518, or storage devices 514.

Computing nodes 510b and 510c are depicted as operating on virtual machine host 512, which may provide shared access to various physical resources, such as physical processors, memory, and storage devices. Any number of virtualization mechanisms might be employed to host the computing nodes.

The various computing nodes depicted in FIG. 5 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610a, 610b, and/or 610n (which may be referred herein singularly as a processor 610 or in the plural as the processors 610) coupled to a system memory 620 via an input/output ("I/O") interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures ("ISAs"), such as the x86, PowerPC, SPARC or MIPS ISAs, or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect ("PCI") bus standard or the Universal Serial Bus ("USB") standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system providing a web-based service, wherein interaction with back-end components is testable in a production environment, the system comprising:
   a first computing node that, when activated, receives requests to perform an operation on behalf of a client of the web-based service, the operation comprising one or more sub-operations;
   one or more additional computing nodes that, when activated, perform the sub-operations in response to a request transmitted from the first computing node; and
   one or more memories having stored thereon computer-executable instructions that, upon execution, cause the system at least to:
   receive at the first computing node a first request to perform the operation; receive a first data indicative of a test condition for the one or more additional computing nodes, the first data appended to the first request;
   initiate processing of the first request based at least in part on determining that a user account associated with the client is authorized to issue the request to perform the operation;
   intercept, during processing of the first request, an invocation of at least one of the sub-operations, the interception based at least in part on the data indicative of the test condition and further based at least in part on the user account being authorized to perform testing; and
   simulate a result of performing the at least one of the sub-operations on one or more additional computing nodes, the result corresponding to the test condition.

2. The system of claim 1, further comprising one or more memories having stored thereon computer-readable instructions that, upon execution, cause the system at least to:
   intercept, during processing of a first sub-operation, an invocation of an additional sub-operation, wherein the additional sub-operation is performed on the one or more additional computing nodes; and
   simulate performing the additional sub-operation based at least in part on a second data indicative of a second test condition for the one or more additional computing nodes.

3. The system of claim 1, wherein a cookie comprises the data indicative of the test condition.

4. The system of claim 3, further comprising one or more memories having stored thereon computer-readable instructions that, upon execution, cause the system at least to:
   transmit at least a subset of the cookie with the data indicative of the test condition associated with performing the at least one of the sub-operations.

5. The system of claim 1, further comprising one or more memories having stored thereon computer-readable instructions that, upon execution, cause the system at least to:
   determine that the user account is authorized to specify the test condition by at least retrieving a record indicative of the user account being associated with a test function.

6. A non-transitory computer-readable storage medium having stored thereon instructions that, upon execution by one or more computing devices, cause the one or more computing devices at least to:
   receive a first request to perform an operation on behalf of a client, the operation comprising invocation of a sub-operation;
   receive a first data indicative of a test condition, the first data appended to the first request;
   intercept an invocation of the sub-operation based at least in part on the first data indicative of the test condition, wherein the sub-operation is indicated to be performed on one or more additional computing devices different than the one or more computer devices on which the operation is performed: and
   simulate a failure of the first request to perform the sub-operation, the failure based at least in part on the test condition; and
   determine that a user account associated with the client is authorized to specify the test condition by at least retrieving a record indicative of the user account being associated with a test function.

7. The non-transitory computer-readable storage medium of claim 6, comprising further instructions that, upon execution by the one or more computing devices, cause the one or more computing devices to at least:
   intercept, during processing of a first sub-operation, an invocation of an additional sub-operation, wherein the additional sub-operation is performed on the one or more additional computing device other than the one or more computing devices on which the operation is performed; and
   simulate performing the additional sub-operation based at least in part on a second data indicative of a second test condition for the one or more additional computing devices.

8. The non-transitory computer-readable storage medium of claim 6, wherein a cookie comprises the data indicative of the test condition.

9. The non-transitory computer-readable storage medium of claim 8, comprising further instructions that, upon execution by the one or more computing devices, cause the one or more computing devices to at least:
   transmit at least a subset of the cookie with the first request to perform the sub-operation.

10. The non-transitory computer-readable storage medium of claim 6, wherein the data indicative of the test condition comprises a plurality of data segments, each data segment comprising information corresponding to one or more of a plurality of sub-operations, including the sub-operation, performed during processing of the operation.

11. The non-transitory computer-readable storage medium of claim 6, wherein intercepting the invocation of the sub-operation comprises stopping an invocation of the sub-operation.

12. The non-transitory computer-readable storage medium of claim 6, wherein the data indicative of the test condition comprises a service identifier and a response code.

13. A computer-implemented method for testing a production-deployed web service, the method comprising:
   receiving a first request corresponding to performing an operation on behalf of a client associated with a user account, the operation comprising an intermediary operation, the intermediary operation comprising a sub-operation;
   receiving a first data indicative of a test condition, the first data appended to the first request;
   intercepting the sub-operation based at least in part on the first data indicative of the test condition, wherein the sub-operation is indicated to be performed on one or more additional computing devices different than one or more computer devices on which the intermediary operation is performed: and
   simulating a failure of the first request to perform the sub-operation, the failure based at least in part on the test condition; and
   determining that the user account is authorized to specify the test condition by at least retrieving a record indicative of the user account being associated with a test function.

14. The method of claim 13, further comprising: intercepting, during processing of a first sub-operation, an invocation of an additional sub-operation, wherein the additional sub-operation is performed on the one or more additional computing devices: and
   simulating performance of the additional sub-operation based at least in part on a second data indicative of a second test condition for the one or more additional computing devices.

15. The computer-implemented method of claim 13, wherein a cookie comprises the data indicative of the test condition.

16. The computer-implemented method of claim 13, wherein intercepting the sub-operation comprises identifying and redirecting an entry point for a function that invokes the sub-operation.

17. The computer-implemented method of claim 13, wherein the data indicative of the test condition comprises a service identifier and a response code.

18. The computer-implemented method of claim 17, further comprising:
   initializing an interception point for a service invocation that corresponds to the service identifier.

* * * * *